US012731199B2

(12) United States Patent
Singh et al.

(10) Patent No.: US 12,731,199 B2
(45) Date of Patent: Sep. 8, 2026

(54) SYSTEMS AND METHODS FOR USE IN NEUTRAL ZONE EXECUTION OF LOGIC

(71) Applicant: MASTERCARD INTERNATIONAL INCORPORATED, Purchase, NY (US)

(72) Inventors: Sachin Singh, Pune (IN); Akash Purohit, Pune (IN); Arunmurthy Gurunathan, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 988 days.

(21) Appl. No.: 17/482,139

(22) Filed: Sep. 22, 2021

(65) Prior Publication Data

US 2022/0138884 A1 May 5, 2022

Related U.S. Application Data

(60) Provisional application No. 63/106,996, filed on Oct. 29, 2020.

(51) Int. Cl.
*G06Q 40/03* (2023.01)
*G06F 16/9535* (2019.01)
(Continued)

(52) U.S. Cl.
CPC ....... *G06Q 50/265* (2013.01); *G06F 16/9535* (2019.01); *G06F 21/32* (2013.01);
(Continued)

(58) Field of Classification Search
USPC .......... 705/37
See application file for complete search history.

(56) References Cited

U.S. PATENT DOCUMENTS 7,761,715 B1 * 7/2010 Califano ............... H04L 9/3236 726/4
7,848,979 B2 * 12/2010 Sundararajan ......... G06Q 40/06 705/37

(Continued)

FOREIGN PATENT DOCUMENTS

KR 10-2017-0082885 7/2016

OTHER PUBLICATIONS

M. Schanzenbach, G. Bramm and J. Schutte, "reclaimID: Secure, Self-Sovereign Identities Using Name Systems and Attribute-Based Encryption," 2018 17th IEEE International Conference On Trust, Security And Privacy In Computing And Communications/ 12th IEEE International Conference (Self Sovereign) (Year: 2018).*

(Continued)

*Primary Examiner* — Chikaodinaka Ojiaku
(74) *Attorney, Agent, or Firm* — Harness, Dickey & Pierce, P.L.C.

(57) ABSTRACT

Systems and methods are provided for executing logic to provide data aggregates. One example method includes receiving, at a computing device of a service provider, from a relying party, a request for a data aggregate for a user based on a logic, where the data aggregate is based on first data for the user, and identifying a control for the first data. The method further includes, upon satisfying the identified control, retrieving, by the computing device, the first data from a first source party, generating a neutral zone, and executing, in the neutral zone, the logic on the retrieved first data. The method then includes providing an output from the executed logic as the data aggregate to the relying party, but not the first data, whereby the data aggregate is provided in lieu of the first data. And, the retrieved first data is deleted by eliminating the neutral zone.

9 Claims, 3 Drawing Sheets

(51) Int. Cl.
*G06F 21/32* (2013.01)
*G06Q 40/08* (2012.01)
*G06Q 50/26* (2012.01)
*G06F 21/62* (2013.01)

(52) U.S. Cl.
CPC ......... *G06Q 40/03* (2023.01); *G06F 21/6245* (2013.01); *G06Q 40/08* (2013.01)

(56) References Cited

U.S. PATENT DOCUMENTS 10,091,349 B1 * 10/2018 Rao ..................... H04M 3/2218
10,970,416 B2 * 4/2021 Scheiblauer .......... G06F 21/602
10,990,693 B1 * 4/2021 Newman ............. G06F 21/6227
11,004,548 B1 * 5/2021 Austin .................. H04L 9/3226
11,095,643 B2 * 8/2021 Huffman ............. G06F 21/6245
11,381,405 B1 * 7/2022 Sundaresan ........... H04L 9/3231
12,141,326 B1 * 11/2024 Barouch ............. G06F 21/6245
12,277,616 B2 * 4/2025 Gibson .................. G06Q 50/16
12,278,813 B2 * 4/2025 Piel ...................... G06Q 20/401
12,278,856 B1 * 4/2025 Crawforth ............. H04L 9/3297
12,316,778 B2 * 5/2025 Sorniotti ............... H04L 9/3263
2002/0073138 A1 * 6/2002 Gilbert .................... G16Z 99/00 709/201
2005/0086096 A1 * 4/2005 Bryant .................. G06Q 40/08 705/1.1
2006/0020611 A1 * 1/2006 Gilbert ................ G06F 21/6254
2006/0149745 A1 * 7/2006 Mengerink ............ G06Q 20/20
2007/0067837 A1 3/2007 Schuster
2007/0289000 A1 * 12/2007 Weiss ............... G06Q 20/40145 726/5
2009/0119141 A1 * 5/2009 McCalmont ..... G06Q 10/06395 705/7.41
2010/0088233 A1 4/2010 Tattan et al.
2010/0251144 A1 9/2010 Shaty
2010/0321156 A1 * 12/2010 Pitt ..................... G06F 21/6245 340/5.82
2011/0213839 A1 * 9/2011 Sundaresan .......... G06Q 10/067 709/204
2011/0321131 A1 12/2011 Austel et al.
2012/0124057 A1 * 5/2012 Daoud ............... G06Q 30/0609 707/748
2012/0124192 A1 * 5/2012 Daoud .................. G06F 16/248 709/224
2013/0091035 A1 * 4/2013 Kota .................. G06Q 30/0278 705/26.35
2014/0081681 A1 * 3/2014 Sundaresan ............ G06Q 30/06 705/7.11
2014/0331200 A1 * 11/2014 Wadhwani ....... G06Q 10/06395 717/101
2015/0324737 A1 * 11/2015 Chrzan .................. G06Q 30/00 705/28
2015/0363586 A1 * 12/2015 Klevan ............... G06F 21/6245 726/19
2016/0098767 A1 * 4/2016 Daoud ............. G06F 16/24575 705/347
2016/0239665 A1 * 8/2016 Hamby ................. G06F 21/577
2017/0039637 A1 * 2/2017 Wandelmer ............ G06Q 40/03
2017/0118195 A1 * 4/2017 Nath ....................... G06F 16/22
2018/0145967 A1 * 5/2018 Matsugashita ........ G06F 21/335
2019/0050551 A1 * 2/2019 Goldman-Kirst ..... G06F 21/335
2019/0069168 A1 * 2/2019 Belote ................... H04W 12/06
2019/0073679 A1 * 3/2019 Sundaresan .......... G06Q 10/063
2020/0089856 A1 * 3/2020 Anderson ............... G06F 21/77
2020/0314205 A1 * 10/2020 Cheng ..................... H04L 67/60
2021/0141902 A1 * 5/2021 Martel .................... G06F 21/57
2021/0173907 A1 * 6/2021 Keith, Jr. ............ H04L 63/0861
2021/0173915 A1 * 6/2021 Keith, Jr. ................ G06F 21/32
2021/0176066 A1 * 6/2021 Keith, Jr. ................ G06F 21/43
2021/0297258 A1 * 9/2021 Keith, Jr. ............. G06V 40/197
2021/0297448 A1 * 9/2021 Keith, Jr. ................ H04L 63/20
2021/0409397 A1 * 12/2021 Bhatt .................. H04L 63/0884
2022/0232093 A1 * 7/2022 Redkokashin .......... G06F 21/45
2023/0064412 A1 * 3/2023 Brindley ................ G06Q 40/03
2024/0354446 A1 * 10/2024 Assouad ................ G16H 40/67

OTHER PUBLICATIONS

A. Bhargav-Spantzel, A. C. Squicciarini and E. Bertino, “Trust Negotiation in Identity Management,” in IEEE Security & Privacy, vol. 5, No. 2, pp. 55-63, Mar.-Apr. 2007(Trust). (Year: 2007).*

A. Banerjee and K. P. Joshi, “Link before you share: Managing privacy policies through blockchain,” 2017 IEEE International Conference on Big Data (Big Data), Boston, MA, USA, 2017, pp. 4438-4447 (Privacy). (Year: 2017).*

* cited by examiner

SYSTEMS AND METHODS FOR USE IN NEUTRAL ZONE EXECUTION OF LOGIC

CROSS-REFERENCE TO RELATED APPLICATION

This application claims the benefit of, and priority to, U.S. Provisional Application No. 63/106,996, filed Oct. 29, 2020. The entire disclosure of the above application is incorporated herein by reference.

FIELD

The present disclosure is generally directed to systems and methods for use in neutral zone execution of logic, and in particular, to systems and methods for use in executing instruction logic, on data aggregated from one or more data structures, to define an aggregate as requested by a party.

BACKGROUND

This section provides background information related to the present disclosure which is not necessarily prior art.

People are known to be associated with identities. The identities are generally specific to the people and often include their names, government-based identifiers (e.g., social security numbers, etc.), mailing addresses, phone numbers, email addresses, credit scores, etc. And, as part of certain interactions by the people with relying parties, the relying parties verify the identities of the people and then rely on the identities of the people in further interactions with the people. Aspects of the identities of the people may further impact the manner by which the relying parties interact with the people (e.g., with regard to available credit terms, premiums for insurance, etc.), or whether the relying parties interact with the people at all (e.g., the relying parties may deny credit accounts based on such aspects of the identities, etc.).

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Relying parties are often compelled to possess personal identifying information (PII) of users, in connection with evaluating the users for different interactions and determining whether to further interact with the users. For example, a relying party may request a user's government ID number (broadly, PII) to secure a credit report for the user, for example, whereby data in the credit report is then utilized by the relying party for purposes of extending credit, offering insurance, offering a lease, etc. As a result, the relying party is in possession of the government ID number of the user, which is not the data upon which the relying party actually relies in making a decision to further interact with the user. Consequently, the relying party is required to provide enhanced security and/or comply with added laws, regulations, etc., based on the possession of the PII of the user. This is problematic for some relying parties, and potentially, increases dangers associated with fraud, stolen identities, etc.

Uniquely, the systems and methods herein permit relying parties to request a score, based on defined logic, whereby the score is calculated and returned to the relying party, but not the actual data upon which the score is related. In particular, a relying party may define a logic for a score, which is based on a credit history, medical data or other PII of the user. The relying party submits a request, with the logic (or identifying the logic), to a service provider. The service provider, in turn, seeks permission from the user, if appropriate, and aggregates the data to a neutral zone and executes the logic to provide the requested score based on the aggregated data. The requested score is provided back to the relying party, without the underlying data, and the neutral zone is employed otherwise, whereby the data is deleted, overwritten or lost. In this manner, the relying party is supplied with the information necessary to evaluate a relationship with the user and/or interact with the user, based on the score, without actually receiving, in general, PII for the user (except as necessary for the specific interactions with the user (e.g., name, address, email address, etc.)). This provides added security for PII, and flexibility to the relying party in defining the logic, upon which to evaluate the user.

Figure 1:
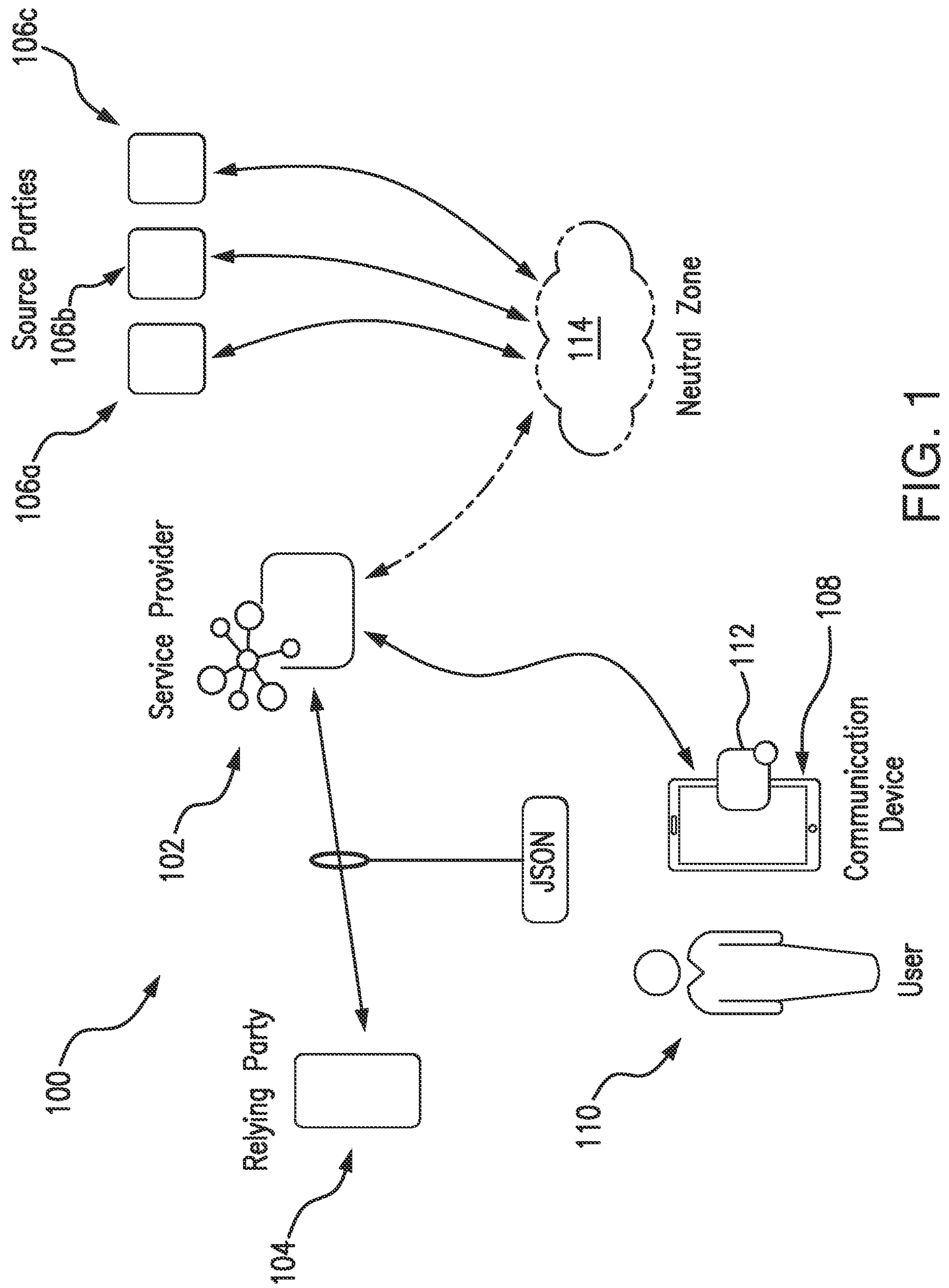
FIG. 1 is an example system of the present disclosure suitable for use in executing logic in a neutral zone to provide data aggregates for users (e.g., to provide aggregation of data for the users or to provide aggregate data for the users, etc.)

FIG. 1 illustrates an example system 100 in which one or more aspects of the present disclosure may be implemented. Although the system 100 is presented in one arrangement, other embodiments may include the parts of the system 100 (or other parts) arranged otherwise depending on, for example, relationships between users and parties, numbers of parties (e.g., relying parties, source parties, etc.) involved in interactions, data required for scoring, privacy requirements, etc.

The system 100 generally includes a service provider 102, a relying party 104, multiple source parties **106*a-c* (or supply parties), and a communication device 108 associated with a user 110, each of which is coupled in communication via one or more networks (e.g., as indicted by the arrowed lines, etc.). The one or more networks may include one or more of, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1**, or any combination thereof.

The service provider 102 of the system 100, generally, is configured to provide one or more identity-based services for users (including the user 110) (e.g., upon registration by the user 110 for such service, upon approval by the user 110 to participate in such service, etc.). In particular herein, the service provider 102 is associated with providing a score or assessment request for identity-based services for relying parties, such as, for example, the relying party 104. In conjunction therewith, the service provider 102 is associated with various data sources, which may include the source parties 106*a-c* and/or one or more data structures associated with the service provider 102 (e.g., included therein, etc.).

In FIG. 1, the service provider 102 is illustrated as a standalone part of the system 100. However, the service provider 102 may additionally, or alternatively, be incorporated in whole or in part with another party in the system 100, such as, for example, a payment network, a business entity, or a banking institution, etc. Specifically, for example, the service provider 102 may be incorporated, in whole or in part, into the Mastercard® payment network and configured to operate as described herein to provide one or more identity-based services to users via and/or in association with the Mastercard® payment network (wherein the Mastercard® payment network is then also configured to process transactions by users with merchants, etc.). In addition, while the service provider 102 is illustrated as a single entity and/or computing device, the service provider 102 may be segregated into multiple different entities and/or computing devices in other embodiments, with data being exchanged therebetween, so that the service provider 102, overall, is still configured to operate as described herein.

The relying party 104 may include an entity, with which users (including the user 110) may attempt to interact based, at least in part, on identities of the users. For example, the relying party 104 may include, without limitation, an employer offering employment to users; an insurance provider offering health insurance, automobile insurance, home owners insurance, etc.; a financial institution (e.g., a bank, etc.) offering credit accounts, mortgage accounts, etc. to users; etc. It should be understood that, in general, there are certain aspects of a user's identity known to the relying party 104 and used in interactions by the relying party 104 with the user, such as, for example, a name, an address, contact information, etc. And, there are other aspects of the user's identity that are only used, generally, to make decisions about the given interaction with the user (or to acquire information about the user to make decisions about interacting with the user). For example, a social security number may be used to acquire a credit score, which is used by the relying party 104 to decide on terms of credit, etc., whereby after the terms are decided, neither the social security number nor the credit score may be needed by the relying party 104. Other aspects of the identity of the user may also be used initially, but not later.

As shown in FIG. 1, the system 100 includes the three example source parties 106*a-c*. The source parties 106*a-c* each includes PII for various users, stored in one or more data structures. The PII is based on an existing, or prior, relationship between the source parties 106*a-c* and users. For example, the source party 106*a* may include a bank, which may have a name, physical address, contact information, social security number, driver's license number, etc., of the user 110. The source party 106*b* may then, for example, include a healthcare provider, which, again, has PII for the user 110, as the user 110 is a patient therewith. The PII may include, without limitation, insurance account numbers, medical history, etc. It should be appreciated that the source parties 106*a-c* may include any different entity, which may be a source of information about the user 110 or other users. What's more, the source parties 106*a-c* are registered with the service provider 102 to provide the PII, as permitted by the user 110, for example, to the service provider 102 in connection with assessment services, as described herein.

The communication device 108 associated with the user 110 is generally a portable communication device, whereby the communication device 108 is carried with and/or around the user 110, etc. The communication device 108 may include, without limitation, a smartphone, a tablet, a laptop computer, a smartwatch, or another suitable device, etc. In the example system 100, the communication device 108 includes a mobile application 112, which is provided by and/or associated with the service provider 102, etc. The mobile application 112 configures the communication device 108 to communicate with the service provider 102 (e.g., to solicit permission of the user 110 to share and/or otherwise use PII, etc.), etc., as described in more detail below. Further, the mobile application 112 may include a digital identity specific application, or it may include, generally, an application intended and/or suitable for additional or other uses (e.g., a financial application, a travel application, a healthcare management application, etc.). In this manner, the mobile application 112 may include a standalone application or, potentially, a software development kit (SDK) included in a mobile application provided by another party and including related or unrelated purposes and/or functionality (e.g., a banking or credit application, a virtual wallet, a healthcare portal, etc.).

While only one service provider 102, one relying party 104, three source parties 106*a-c*, one communication device 108 and one user 110 are illustrated in the system 100, it should be appreciated that additional ones of these parts/users may be included in other system embodiments. What's more, one or more banking institution(s) and/or a payment network may be included in the system 100 of FIG. 1 and may include one or more of the parts illustrated in the system 100.

Figure 2:
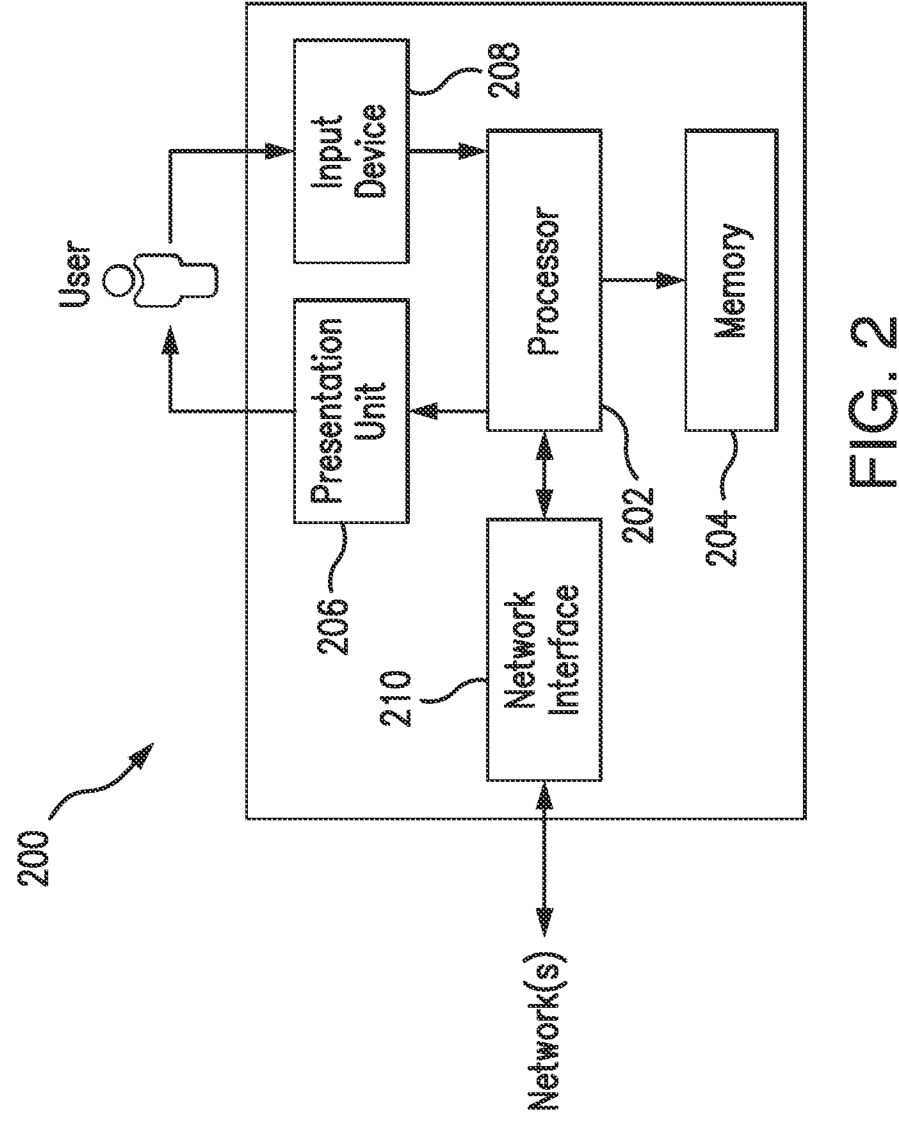
FIG. 2 is a block diagram of a computing device that may be used in the system of FIG. 1.

FIG. 2 illustrates an example computing device 200 that can be used in the system 100 of FIG. 1. The computing device 200 may include, for example, one or more servers, workstations, personal computers, laptops, tablets, smartphones, virtual devices, etc. In addition, the computing device 200 may include a single computing device, or it may include multiple computing devices located in close proximity or distributed over a geographic region, so long as the computing devices are specifically configured to function as described herein. In the example embodiment of FIG. 1, each of the service provider 102, the relying party 104, and the source parties 106*a-c* may include or may be implemented in a computing device consistent with the computing device 200 (coupled to (and in communication with) the one or more networks of the system 100). In addition, the communication device 108 may also be considered a computing device generally consistent with computing device 200 for purposes of the description herein. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, identity details and data related to identities of users, assessment logic (e.g., rules, formulas, etc.), permission schemes, and/or other types of data (and/or data structures) suitable for use as described herein.

Furthermore, in various embodiments, computer-executable instructions (e.g., in the form of the mobile application 112 and/or an SDK associated therewith, etc.) may be stored in the memory 204 for execution by the processor 202 to cause the processor 202 to perform one or more of the functions described herein (e.g., one or more of the operations of method 300, etc.), such that the memory 204 is a physical, tangible, and non-transitory computer readable storage media. Such instructions often improve the efficiencies and/or performance of the processor 202 and/or other computer system components configured to perform one or more of the various operations herein (e.g., one or more of the operations in method 300, etc.), whereby upon performance of the same the computing device 200 may be transformed into a special purpose computer system (e.g., performance of one or more of the operations herein transforms the computing device 200 into a special purpose computer system, etc.). It should be appreciated that the memory 204 may include a variety of different memories, each implemented in one or more of the functions or processes described herein.

In the example embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information, visually or audibly, for example, to a user of the computing device 200 (e.g., solicitation for permission to share data, etc.) whereby the information may be displayed at (or otherwise emitted from) computing device 200, and in particular at presentation unit 206. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user of the computing device 200 (i.e., user inputs) such as, for example, authentication inputs associated with permission, etc. as further described below. The input device 208 may include a single input device or multiple input devices. The input device 208 is coupled to (and is in communication with) the processor 202 and may include, for example, one or more of a keyboard, a pointing device, a mouse, a camera, a touch sensitive panel (e.g., a touch pad or a touch screen, etc.), another computing device, and/or an audio input device. In various example embodiments, a touch screen, such as that included in a tablet, a smartphone, or similar device, may behave as both the presentation unit 206 and an input device 208.

Further, the illustrated computing device 200 also includes a network interface 210 coupled to (and in communication with) the processor 202 and the memory 204. The network interface 210 may include, without limitation, a wired network adapter, a wireless network adapter, or other device capable of communicating to one or more different networks herein and/or with other devices described herein. Further, in some example embodiments, the computing device 200 may include the processor 202 and one or more network interfaces incorporated into or with the processor 202.

Referring again to FIG. 1, as suggested above, the user 110 is associated with PII, which generally defines the identity of the user 110. The PII is segregated, in this example embodiment, into different tiers, such as, for example, Tier 1, Tier 2 and Tier 3, in ascending levels of privacy. As such, Tier 1 PII (low security) may include a name, a mobile phone number, an email address, a primary account number (PAN) for a payment card, vehicle registration numbers, or a social history, while Tier 2 PII (middle security) may include a government ID number (e.g., a social security number, etc.), bank account information, property tax information, salary slips, annular income reports, and/or naturalization and residence information, etc. And, Tier 3 PII (high security) may include medical information, a loan liability, stock holdings and documents, etc. It should be appreciated that the PII for the user 110 and other users may be segregated into tiers differently in other embodiments, or potentially included in a single tier. What's more, it should be appreciated that the different tiers of PII may be associated with different manners of authentication and/or notice. For example, a Tier 1 disclosure may require only notice, while a Tier 2 disclosure may require authentication and approval of the user 110 via a password, code or response at the communication device 108, and Tier 3 may require biometric authentication and approval, etc. As above, the different tiers may be associated with different authentication and/or notice requirements depending on, for example, privacy policies, concerns, regulations, user instructions/settings, etc., or otherwise.

It should be appreciated that a portion of the PII of the user 110 may be stored in a data structure (e.g., in memory 204, etc.) of the service provider 102, while another portion (or other portions) of PII of the user 110 may be stored at the source parties 106*a-c* in one or more countries. Further, when stored at the source parties 106*a-c*, the data structure of the service provider 102 may include an identification of each of the source parties 106*a-c* and a description of the PII stored thereat, and potentially, further authentication or notice requirements associated with cross-border data exchanges involving the PII, etc. Regardless, as a request associated with a particular PII is received, notice and/or authentication controls associated with the tier of the PII may be employed by the service provider 102, regardless of the location of the data (e.g., stored at the service provider 102, or elsewhere, etc.).

Thereafter, the relying party 104 identifies the potential for a business relationship with the user 110, for example, based on a request from the user 110 (e.g., via an application or otherwise, etc.). In connection therewith, the relying party 104 has the option to form a relationship with and/or set terms of the relationship (broadly, interact) with the user 110, whereby an assessment of the user 110 would aid in one or more aspects of the interactions. The assessment is defined, at least partially, based on PII of the user 110. The assessment may be specifically defined by the relying party 104 alone, or in concert with the service provider 102. Or, the assessment may be wholly defined by the service provider 102. The assessment is defined by logic which links the various PII of the user 110 in a particular manner to provide a score and/or a result relative to a threshold (and relative to the desired interaction by the user 110 with the relying party 104). For example, an assessments may include a credit score minus fifty times a number of insurance incidents by the user, and compared to a threshold of 700, whereby the result is yes or no. The particular logic employed may be tuned and/or edited by the relying party 104 consistent with business objectives, goals, risks, statistical analyses, etc., to ensure the assessment yields desired insight into the user 110 for assessing the desired or required interactions with the user 110.

In any event, in determining to form the relationship with the user 110 (or not), the relying party 104 is configured to compile and submit a request for an assessment of the user 110 to the service provider 102 (e.g., as an application programming interface (API) call, etc.). The request includes limited information about the user 110 and also a logic for the assessment (or identifier of the logic for the assessment (or of predefined logic for use in the assessment)). In one example, the request includes the logic in a JSON request, transmitted via an API exposed by the service provider 102, where a JSON token includes the specific logic to be employed. Alternatively, the request may identify a logic, which is stored in memory (e.g., memory 204, etc.) of the service provider 102, by identifier, so that the relying party 104 may reference the logic for repetitive requests, to avoid repeatedly sending the same logic. Regardless, the logic often includes a listing of PII, upon which it relies. The request also includes one or more details of the relying party 104, such as, for example, an identifier or ID, etc.

Upon receipt of the request, the service provider 102 is configured to identify the data (e.g., the PII, a profile for the user 110 associated with the data/PII, etc.) required to fulfill the logic included in the request (or identified in the request) and to determine, based on the identified data, whether a notice or authentication is required. When required, the service provider 102 is configured to transmit the notice or request for authentication, to the user 110, at the communication device 108. The notice of request may be provided as an email, SMS message, application push message to the application 112, etc. Where a response is required, the user 110 responds, via the communication device 108, to the service provider 102 (e.g., with consent, biometric, etc.). Here, the service provider 102 may not take any further action until the response is received from the user 110.

In turn, following such notice (or upon response thereto by the user 110) the service provider 102 is configured to generate a neutral zone 114 (e.g., as an API call for generation of the neutral zone 114 through a desktop as a service (DAAS), etc.). In connection therewith, the neutral zone 114 is an on-demand virtual machine space (e.g., a DAAS, etc.) where the score (e.g., a logic score, an assessment score, etc.) for the user 110 is generated. Thus, the neutral zone 114 is created, on a demand by the service provider 102, as a location (e.g., on a cloud premise, etc.) to push the desired scoring logic (be it logic provided by the relying party or logic otherwise selected/available) and corresponding PII (or other data) to be used to generate the assessment score for the user 110 (whereby the neutral zone 114 the includes the desired scoring logic and corresponding PII (or other data) to be used in generating the score). The neutral zone 114, then, may be associated with the service provider 102, but separate and/or apart from the relying party 104 and source parties 106*a-c*. That said, once generated, the details of the neutral zone 114 are then provided to the service provider 102.

The service provider 102 is also configured to retrieve or request identified PII (broadly, data) from itself and/or from the source parties 106*a-c*, as appropriate (via one or more APIs, etc.). The request to the source parties 106*a-c* may include a JSON request, etc. The source parties 106*a-c* are, in turn, configured to return the requested PII, in response to the request. The PII may be returned, for example, through an API call to the service provider 102, etc. As the PII is returned, it is either passed to the neutral zone 114 by the service provider 102 (e.g., in JSON format, etc.) or it is directly routed to the neutral zone 114 (e.g., in JSON format, etc.) from the source parties 106*a-c*, etc. Similarly, the desired logic (e.g., the template, code file (e.g., .java file, etc.), etc.) to be used to generate the score (based on the returned data) may be directed (e.g., pushed, etc.) to the neutral zone 114 by the service provider 102 or by the relying party 104, or it may be retrieved by the neutral zone 114. Or, the service provider 102 may identify an appropriate logic (or template) to be used, from logic (or templates) available on file, based on the data identified by the relying party 104 to be used in generating the score, and direct the selected logic to the neutral zone 114.

Once the identified data is received, or retrieved, the service provider 102 is configured to employ the logic provided by (or identified by or selected for) the relying party 104, in (or by) the neutral zone 114, to determine an output. The output may include a score, a rating, or a result based on a threshold (e.g., Y/color1 when the rating is above 5.0 and N/color2 when the rating is at or below 5.0, etc.). As can be appreciated, the output is an aggregate (or aggregation) of the identified PII for the logic, consistent with the logic. The service provider 102 is configured to then provide the output to the relying party 104. In connection therewith, the service provider 102 is configured to end the neutral zone 114, thereby opening underlying resources to other neutral zones generated by the service provider 102. This, in effect, deletes the logic and the PII employed in the logic at the neutral zone 114. Neither the PII nor the particular logic employed nor the resulting score/output is retained in the neutral zone 114.

The relying party 104 then is configured to receive the output/result, and to proceed, or not, with the potential interaction with the user 110. This may include, for example, extending credit to the user 110, offering insurance terms to the user 110, etc. based on the result.

Figure 3:
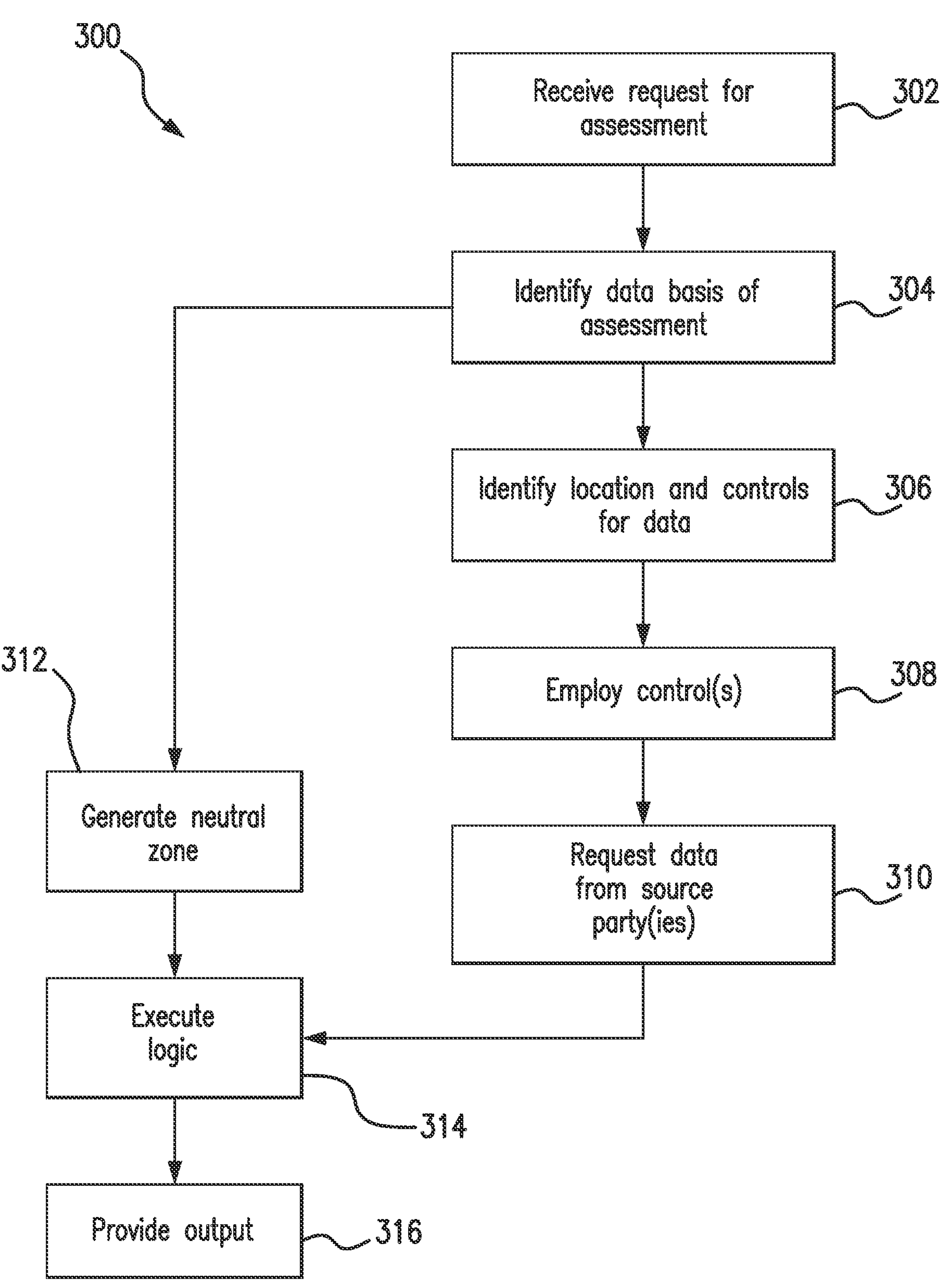
FIG. 3 is an example method, which may be implemented in connection with the system of FIG. 1, for use in executing logic, as defined by a relying party, in a neutral zone, to define an aggregate score for a user (e.g., based on aggregate data and/or an aggregation of data for the user, etc.).

FIG. 3 illustrates an example method 300 for use in executing logic to provide data aggregates for users. The example method 300 is described as implemented in the service provider 102 and other aspects of the system 100. Reference is also made to the computing device 200. However, the methods herein should not be understood to be limited to the system 100 or the computing device 200, as the methods may be implemented in other systems and/or computing devices. Likewise, the systems and the computing devices herein should not be understood to be limited to the example method 300.

At the outset in the method 300, it should be appreciated that the service provider 102 includes a data container or structure for the user 110, which includes tiers (e.g., three tiers, etc.) of data (either including the data (or PII) or a description of the location of the data, for example, at ones of the source parties 106*a-c*, etc.), where each tier includes a specific control (e.g., notice requirement, authentication requirement, etc.). The source parties 106*a-c* also include data structures which includes PII for the user 110. For example, the source party 106*a* may include health information about the user 110; the source party 106*b* may include a bank, which possesses financial data about the user 110; and the source party 106*c* may include a bank, which possesses a basic credit history and a salary profile of the user 110. The above descriptions of the data possessed by the source parties 106*a-c* is merely example in nature. The source parties 106*a-c* and other source parties may include various other data in other embodiments.

That said, the service provider 102 receives, at 302, a request for an assessment of the user 110. The request includes a logic for a specific output, or, alternatively, a pointer or identifier to a logic stored in the service provider 102. The logic may be received, from the relying party 104, as a JSON message, or in another suitable format, etc. For instance, the logic may specify use of (or retrieval of) one or more particular data profiles for the user 110 (e.g., a financial profile, an existing insurance profile, a credit profile, a healthcare profile, a salary profile, a customer history profile, etc.), in connection with assessing the user 110. And, each of the profiles may be associated with one or more individual parameters, that are each assigned a point value in accordance with the logic. The logic may then specify a manner for combining the point values in order to generate a score for the user 110, for example, based on presence or availability of the individual parameters of the various data profiles specified in the given logic. In particular, the points associated with the parameters may be assigned to the user 110, when the given parameter is present in the neutral zone 114 for the profile retrieved for the user 110 (e.g., points may be assigned for each of the parameters that are available for the user 110 (e.g., in sum, as an average for each of the particular data profiles specified by the logic, on a desired scale (e.g., on a scale of one to ten, etc.), etc.), etc.). In response to the request, the service provider 102 identifies, at 304, the data basis for the logic, or the data upon which the logic is based. This may include, for example, health data, financial data, a basic credit profile, a salary history, etc., a combination thereof, or a part thereof, etc.

Once identified, the service provider 102 identifies, at 306, the location and controls associated with the data, as defined, for example, by the data container in which the data is stored or described. For example, the health data may be identified in Tier 3 of the container, and maintained at the source party 106*a*, whereby a control of biometric authentication is required. Additionally, or alternatively, the data may include financial data and a credit history which are indicated in Tier 2 and maintained at the source parties 106*b-c*, respectively, whereby a control of password authentication is required. It should be appreciated that different controls may be employed for different data, for data in different tiers, and for data in different locations (e.g., biometric authentication required for cross-border data, etc.), etc.

When one or more controls are implicated by the identified data, from the data container, the service provider 102 employs, at 308, the controls for the data. In one example, the service provider 102 transmits a notice to the user 110 (e.g., for Tier 1 data, etc.), indicating the service provider 102 is retrieving specific data, the source of the data, and/or the relying party 104 is requesting an assessment based on the data, etc. In another example, the service provider 102 may transmit a message, as an email, SMS message, or application notification, to the communication device 108, soliciting an authentication or permission from the user 110 (e.g., for Tier 2 data, etc.). The user 110 may, in turn, select YES or otherwise grant permission, or not. Like above, the message may indicate the service provider 102 is retrieving specific data, the source of the data, and/or the relying party 104 requesting an assessment based on the data, etc. In a still further example, the service provider 102 may transmit a message, as an application notification, to the application 112 at the communication device 108, soliciting a biometric authentication from the user 110 (e.g., for Tier 3 data, etc.). The user 110, in turn, via the communication device 108, responds to the request, as indicated (e.g., by selecting YES, or providing a biometric, etc.). In turn, the service provider 102 continues to employ the controls, by noting the permission, or verifying the biometric of the user 110, etc.

It should be appreciated that the service provider 102 may rely on only one control (e.g., biometric authentication, etc.), when multiple controls are implicated or available, thereby avoiding undue friction with the user 110.

When the control is satisfied, the service provider 102 requests, at 310, data from the source parties 106*a-c* (or other source parties), as appropriate, or retrieves data stored at the service provider 102. In requesting the data, the service provider 102, for example, may transmit a data request, in JOSN format, to one or more of the source parties 106*a-c*, depending on the required data. The message (or data request) includes, generally, a description of the data required, instructions to return the data (e.g., via an API, etc.) and, if appropriate, an indication of satisfied controls (e.g., biometric authentication complete, etc.). In response, the source parties 106*a-c* provide the data in the manner requested. For example, the source party 106*a* may provide a health profile, or part thereof, to the service provider 102, via an API call to the service provider 102, etc.

With continued reference to FIG. 3, the service provider 102 also generates a neutral zone 114, at 312, which may be performed in response to identifying the data basis of the request for the assessment (as shown) or otherwise (e.g., earlier or later, etc.). In general, the neutral zone 114 is generated prior to receipt of the data from the source parties 106*a-c*, whereby the data is received into the neutral zone 114 (e.g., directly from the source parties 106*a-c* (such that the service provider 102 may not actually see the data, etc.), via the service provider 102 upon receipt from the source parties 106*a-c*, etc.).

At 314, the service provider 102 executes the logic for the request, based on the identified data, in the neutral zone 114. The logic may provide, for example, a numerical output, a color output, a pass/fail output, a combination thereof, etc. Regardless of form, the output is provided, at 316, by the service provider 102 to the relying party 104. The output may be provided as a message, in response to the request, or otherwise. The output will generally not include any of the PII used by logic to determine the output (apart from identifying the output to a particular user 110 or request). As such, for example, where the output is based on a credit score, the output will be pass/fail, red/green or a score, but the message to the relying party 104 with the output will not include the credit score. That said, limited PII (or more) may be included in the message to the relying party 104, as desired or needed to respond to the original request.

What's more, upon providing the output, or after the output is determined, the neutral zone 114 is deleted at the service provider 102, whereby the logic and the PII underlying the output is eliminated, or at least not recallable or indexed at the service provider 102.

In an example application of the present disclosure, the relying party 104 may include a new insurance provider (or new insurance company) requesting data validation and scoring (in accordance with the present disclosure) as part of offering a new insurance product to the user 110. As such, as part of interacting with the user 110, the insurance provider may submit a request for an assessment of the user 110 to the service provider 102. In this example, the request includes a user ID for the user 110 (e.g., the user's name, a phone number for the communication device 108 associated with the user 110, etc.), and an identification of the particular logic (or template(s)) to be used in generating the desired assessment score (e.g., a loan calculation logic and an insurance calculation logic, etc.).

Upon receiving the request, the service provider 102 determines the required data to be used with the specified logic. In so doing in this example, the service provider 102 determines that such data relates to an existing health/insurance profile for the user 110, a financial profile for the user 110, and a basic credit profile for the user 110. In connection therewith, the service provider 102 determines (e.g., from a data container associated with the service provider 102, a data container related to the user 110, etc.) that the data relating to the basic credit profile for the user 110 (e.g., a current credit score, an address, a phone number, etc.) is included in a data structure accessible by the service provider 102 (in that the service provider is associated with a payment network in this example); that the data relating to the financial profile of the user 110 (e.g., a primary account number (PAN) for an account of the user 110, am average monthly deposit, a last deposit amount, an average balance, etc.) is available from a financial institution (broadly, a source party) associated with the user 110 (e.g., at which the user 110 has an existing account, etc.); and that the data relating to the health/insurance profile (e.g., health insurance data, prior health conditions, etc.) for the user 110 is available from a prior insurance provider (broadly, a source party) associated with the user 110 (e.g., at which the user 110 had a prior insurance product, etc.).

At about the same time, the service provider 102 also determines (e.g., from the data container associated with the service provider 102, the data container related to the user 110, etc.) required controls for the different data. For instance, the service provider 102 may determine that the data relating to the basic credit profile for the user 110 includes Tier 1 data, which requires a notification to be transmitted to the user 110 regarding the request. In addition, the service provider 102 may determine that the data relating to the financial profile of the user 110 includes Tier 2 data, which requires authentication and approval of the user 110 via a password (e.g., provided by the user 110 at the communication device 108, etc.). And, the service provider 102 may determine that the data relating to the health profile of the user 110 includes Tier 3 data, which requires biometric authentication and approval by the user 110 (e.g., at the communication device 108, etc.). As such, the service provider 102 identifies the user 110 from the user ID included in the request (e.g., a user profile for the user 110 generated upon registration of the user for the services herein, etc.), and transmits the appropriate notifications and solicits the appropriate approval from the user 110 at the communication device 108 associated with the user (e.g., as identified in the profile for the user 110 at the service provider 102, based on the user ID for the user 110 where the user ID includes a phone number for the communication device 108, etc.).

Once the service provider 102 receives the required approvals from the user 110 (e.g., for the Tier 2 and Tier 3 data, etc.), the service provider 102 transmits requests to the user's financial institution and the user's prior insurance provider for the data related to the user's financial profile and health profile (in JSON format), including the user ID for the user 110 (to allow the financial institution and the prior insurance provider to identify the user and the requested data). Additionally, the service provider 102 retrieves the data related to the user's basic credit profile from the payment network. In turn, the service provider 102, the user's financial institution, and the user's prior insurance provider return the requested data (e.g., as a JSON token, etc.) to the neutral zone 114 generated for the user 110, where the logic specified by the new insurance provider in the request is executed based on the data returned to the neutral zone 114. A resulting score (or scores) (or color code(s), etc.) is(are) then generated for the user 110 in the neutral zone 114.

An example segment of a JSON token received from the user's financial institution may include the following:

```
{
  "bankCode" : "xyz001",
  "programCode" : "554RE",
  "firstName" : "Akash",
  "address" : {
    "streetAddress" : "naist street",
    "city" : "XYZ",
    "postalCode" : "11443-211"
  }
  "phoneNumbers" : [
    {
      "type" : "home",
      "number" : "123-456-7890"
    }
  ],
  "bank" : [
    {
      avg_monthly_deposit = 1000,
      last_deposit_amt = 234,
      avg_balance_monthly = 1500
    }
  ]
}
```

An example segment of a JSON token received from the user's prior insurance provider may include the following:

```
{
  "Insurance" : {
    "Template" : [
      "ID" : "InsuranceT001",
      "Data Layer" : "T2",
      "mode" : "OneTime Score",
      "category" : "Medical
    ]
  }
  "Consent" : "Approved T2",
  "ProductInfo" : "Term Insurance",
  "Policy Amount" : 75000,
  "Payment" : "Credit Card 1111-2222-3333-4444"
  "Schedule" : "Annual",
  "CustomerInfo" : "Customer details",
  "DeviceInfo" : "Device details"
}
```

Also in this example, the specified logic associates certain parameters of each of the profiles to be used in assessing the user 110 with points. Example parameters and point values are included in Table 1.

TABLE 1

| Profile | Parameter | Point Value |
|---|---|---|
| Health/ Insurance | Current Policy Amount | 2 |
| | Premium Fault (Missed Premiums) | 5 |
| | Premium Payment Mode (Credit/Debit) | 2 |
| | Premium Schedule (Monthly/Quarterly, Yearly) | 2 |
| Financial | Monthly Deposit | 2 |
| | Last Deposit | 2 |
| | Transaction Profile (Fraud Activity) | 5 |
| | Average Account Balance | 2 |
| Credit | Credit Score | 5 |
| | Address | 3 |
| | Phone Number | 3 |

The specified logic in this example also indicates the manner in which the points are to be assigned to the user 110, and then how to combine the points to generate a score for the user 110. In particular in this example, for each of the profiles in Table 1, the retrieved data included in the neutral zone 114 is evaluated to determine if it includes one or more of the identified parameters for the profile. Points are then aggregated, for each profile, for each of the included parameters. In this example, the retrieved data for the health/insurance profile includes the current policy amount, the premium payment mode, and the premium scheduled (see, the example segment of the JSON token received from the user's prior insurance provider above), resulting in 6 total points. The retrieved data for the financial profile includes the user's monthly deposit, last deposit, and average account balance (see, the example segment of the JSON token received from the user's financial institution above), for 6 total points. And, the retrieved data for the credit profile includes the user's credit score, address, and phone number, resulting in 11 total points.

The specified logic further indicates, in this example, that the point total for each of the profiles is limited to (or capped at) 10 total points (e.g., to thereby provide a scale of 1-10 for the points, etc.), and that the points for the three profiles are averaged to provide an overall point value (or score) for the user 110. As such, in the above example, the resulting overall point value (or score) for the user 110 is 7.3 (i.e., (6+6+10)/3) (on a scale of 1-10).

The score, in this example, is then provided back to the new insurance provider for user 110 in further interacting with the user 110 (e.g., to determine which insurance products are available to the user 110 based on comparison of the score to one or more thresholds, to determine whether or not to even continue interacting with the user 110 based on comparison of the score to one or more thresholds, etc.). And, the neutral zone 114 is taken down (and all data, scoring calculations, etc. are erased/deleted from the neutral zone 114).

In another example application of the present disclosure, the relying party 104 may include a new bank requesting data validation and scoring (in accordance with the present disclosure) as part of offering a new service to the user 110. As such, as part of interacting with the user 110, the bank may submit a request for an assessment of the user 110 to the service provider 102. In this example, the request again includes a user ID for the user 110 (e.g., the user's name, a phone number for the communication device 108 associated with the user 110, etc.), and an identification of the particular data to be used in generating the desired assessment score (customer history profile data and salary profile data in this example).

Upon receiving the request, the service provider 102 determines the particular logic (or template(s)) to be used in generating the desired assessment score (e.g., a credit card calculation logic and an profile validation calculation logic, etc.) based on the identified data. In addition, the service provider 102 determines (e.g., from a data container associated with the service provider 102, a data container related to the user 110, etc.) that the data relating to the customer history profile for the user 110 (e.g., a name, an address, a phone number, etc.) is included in a data structure accessible by the service provider 102 (in that the service provider is again associated with a payment network in this example and such data is housed by the payment network in connection with one or more other services provided by the payment network to the user 110); and that the data relating to the salary profile of the user 110 (e.g., a current employer of the user 110, an average monthly wage, an annual wage, an average annual salary for the last five years, etc.) is also included in a data structure accessible by the service provider 102 (housed by the payment network in connection with one or more other services provided by the payment network to the user 110).

At about the same time, the service provider 102 also determines (e.g., from the data container associated with the service provider 102, the data container related to the user 110, etc.) required controls for the different data. For instance, the service provider 102 may determine that the data relating to the customer history profile for the user 110 includes Tier 1 data, which requires a notification to be transmitted to the user 110 regarding the request. And, the service provider 102 may determine that the data relating to the salary profile of the user 110 includes Tier 2 data, which requires authentication and approval of the user 110 via a password (e.g., provided by the user 110 at the communication device 108, etc.). As such, the service provider 102 identifies the user 110 from the user ID included in the request (e.g., a user profile for the user 110 generated upon registration of the user for the services herein, etc.), and transmits the appropriate notifications and solicits the appropriate approval from the user 110 at the communication device 108 associated with the user (e.g., as identified in the profile for the user 110 at the service provider 102, based on the user ID for the user 110 where the user ID includes a phone number for the communication device 108, etc.).

Once the service provider 102 receives the required approvals from the user 110 (e.g., for the Tier 2 data, etc.), the service provider 102 retrieves the data related to the user's customer history profile and salary profile from the payment network. In turn, the service provider 102 returns or directs the requested data (e.g., as JSON tokens, etc.) to the neutral zone 114 generated for the user 110, where the logic identified by the service provider 102 is executed based on the data returned/directed to the neutral zone 114. A resulting score (or scores) (or color code(s), etc.) is(are) then provided back to the new bank for user 110 in further interacting with the user 110 (e.g., to determine qualification for the new service, etc.). And, the neutral zone 114 is taken down.

In view of the above, the systems and methods herein provide for executing logic to provide data aggregates for certain data (such as PII, etc.). In particular, a logic may be defined by a relying party to define a metric by which a user may be assessed for a relationship with the relying party (e.g., for a credit account, for insurance, for employment, etc.). The service provider is then permitted to pull data, underlying the logic, consistent with controls for the data (e.g., as defined by tiers and users, etc.). The logic is executed in a neutral zone, to segregate the data and logic, and an output is generated and provided to the relying party, with the neutral zone then being eliminated (along with the data and logic therein). In this manner, a configurable assessment is provided with enhanced security through the neutral zone so that PII data storage is limited, yet assessments provided.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one or more of the following operations: (a) receiving, at a computing device of a service provider, from a relying party, a request for aggregation of data for a user based on a logic, the aggregation of data based on at least first data for the user; (b) identifying a control associated with the first data; (c) upon satisfying the identified control, retrieving, by the computing device, the first data from a first source party; (d) generating, by the computing device, a neutral zone associated with the service provider; (e) executing, in the neutral zone, the logic on the retrieved first data; (f) providing an output from the executed logic as the aggregation of data to the relying party, but not the first data, whereby the aggregation of data is provided in lieu of the first data; and (g) deleting the retrieved first data by eliminating the neutral zone of the service provider.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in executing logic to secure personal identifying information and to provide data aggregates, the method comprising:

receiving, at a computing device of a service provider, from a relying party, a request to provide a score based on an aggregation of personal identifying information (PII) of a user, without providing the PII of the user upon which the score is based, wherein the score is defined by a logic and wherein the logic is defined by the relying party;

identifying a control associated with first data, the first data including at least a first portion of the PII;

in response to the request, automatically generating, by the computing device, an isolated neutral zone as an on-demand virtual machine that is separate from the computing device of the service provider, the isolated neutral zone including the logic;

based on satisfying the identified control, retrieving, by the computing device, the first data from a first source party and passing the first data into the neutral zone, the first source party separate from the service provider and the relying party;

retrieving, by the computing device, second data from a second source party and passing the second data into the neutral zone, the second data including at least a second portion of the PII, the second source party separate from the service provider, the relying party, and the first source party;

temporarily storing, in the isolated neutral zone, the first data and the second data;

executing, exclusively within the isolated neutral zone, by the on-demand virtual machine, the logic on the temporarily stored PII in the neutral zone, by assigning points for multiple parameters of the PII and aggregating the assigned points to calculate the score;

transmitting, by the computing device, the score to the relying party, while restricting the PII from being provided to the relying party; and after executing the logic and transmitting the score, deleting the neutral zone to delete the temporarily stored PII and the logic from the on-demand virtual machine, thereby preventing subsequent access to the PII from the on-demand virtual machine.

2. The computer-implemented method of claim 1, wherein identifying the control associated with the first data include identifying the control based on a data container, the data container including multiple tiers; and wherein one of the multiple tiers is associated with the first data and wherein the control is linked to said one of the multiple tiers.

3. The computer-implemented method of claim 1, wherein the request includes the logic.

4. The computer-implemented method of claim 1, wherein the request includes an identifier of the logic, in lieu of the logic.

5. A system for use in executing logic to secure personal identifying information and to provide data aggregates for users, the system comprising a service provider having at least one computing device configured to:

receive, from a relying party, a request to provide a score, which is based on an aggregation of personal identifying information (PII) of a user, without providing the PII of the user upon which the score is based, wherein the score is defined by a logic and wherein the logic is defined by the relying party;

identify a control associated with first data, wherein the first data includes at least a first portion of the PII;

in response to the request, automatically generate an isolated neutral zone as an on-demand virtual machine that is separate from the at least one computing device of the service provider, wherein the isolated neutral zone includes the logic;

upon satisfying the identified control, retrieve the first data from a first source party and pass the first data into the neutral zone, whereby the first data is stored in the neutral zone;

retrieve second data from a second source party and pass the second data into the neutral zone, wherein the second data includes at least a second portion of the PII, whereby the second data is stored in the neutral zone;

temporarily store the first data and the second data in the isolated neutral zone;

execute, exclusively within the isolated neutral zone, the logic on the temporarily stored PII, by assigning points for multiple parameters of the temporarily stored PII and aggregating the assigned points to calculate the score;

transmit the score, to the relying party in response to the request, while restricting the PII from being provided to the relying party; and after executing the logic and transmitting the score, delete the neutral zone to delete the temporarily stored PII and the logic from the on-demand virtual machine, thereby preventing subsequent access to the PII from the on-demand virtual machine.

6. The system of claim 5, wherein the request includes the logic.

7. The system of claim 5, wherein that at least one computing device is configured, in order to identify the control associated with the first data, to identify the control based on a data container; and wherein the data container includes multiple tiers of data, and wherein one of the multiple tiers is associated with the first data and wherein the control is linked to said one of the multiple tiers.

8. The system of claim 5, wherein the request includes an identifier of the logic, in lieu of the logic.

9. The system of claim 5, wherein the at least one computing device is further configured to:

transmit a request for a biometric authentication to a communication device associated with the user;

verify a response, from the user via the communication device, to the request for the biometric authentication; and in response to verification of the response from the user, retrieve the first data from the first source party.

* * * * *